(12) United States Patent
Hsu

(10) Patent No.: US 6,559,843 B1
(45) Date of Patent: May 6, 2003

(54) SEGMENTED RAY CASTING DATA PARALLEL VOLUME RENDERING

(75) Inventor: William M Hsu, Littleton, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/607,021

(22) Filed: Feb. 26, 1996

Related U.S. Application Data

(63) Continuation of application No. 08/130,600, filed on Oct. 1, 1993, now abandoned.

(51) Int. Cl.$^7$ .............................................. G06T 15/00
(52) U.S. Cl. ....................... 345/421; 345/424; 345/427; 345/505
(58) Field of Search ................................ 395/163, 120, 395/121, 124, 127, 502, 505; 345/420, 421, 424, 427, 502, 505

(56) References Cited

U.S. PATENT DOCUMENTS

| | | | | |
|---|---|---|---|---|
| 4,821,210 A | | 4/1989 | Rumbaugh ................... 364/518 |
| 4,985,856 A | * | 1/1991 | Kaufman et al. ............ 395/124 |
| 5,101,475 A | * | 3/1992 | Kaufman et al. ............ 395/124 |
| 5,187,660 A | | 2/1993 | Civanlar et al. ........ 364/413.19 |
| 5,201,035 A | | 4/1993 | Stytz et al. .................. 395/163 |
| 5,297,550 A | | 3/1994 | Margosian ................ 128/653.2 |
| 5,297,551 A | | 3/1994 | Margosian ................ 128/653.2 |
| 5,361,385 A | | 11/1994 | Bakalash .................... 395/124 |
| 5,412,763 A | | 5/1995 | Tanaka ........................ 395/124 |

OTHER PUBLICATIONS

G. Vezina, et al, "Volume Rendering on the MasPar MP–1", Proceedings of Workshop on Volume Visualization 1992, ACM Press, Oct. 1992, pp. 3–8.

P. Schroder, et al, "Data Parallel Volume Rendering as Line Drawing", Proceedings of Workshop on Volume Visualization 1993, ACM Press, Oct. 1992, pp. 25–33.

Peter Schroder, et al, "Fast Rotation of Volume Data on Data Parallel Architectures", Proceedings of Visualization 1991, IEEE Computer Science Press, Oct. 1991, pp. 50–57.

C. Montani, et al, "Parallel Volume Visualization on a Hypercube Architecture", Proceedings of Workshop on Volume Visualization 1992, ACM Press, Oct. 1992, pp. 9–15.

T. Elvins, "A Survey Of Algorithms For Volume Visualization", Computer Graphics, vol. 26, No. 3, Aug. 1992, pp. 194–201.

M. Levoy, "Efficient Ray Tracing of Volume Data", ACM Transactions On Graphics, vol. 9, No. 3, Jul. 1990, pp. 245–261.

M. Levoy, "Display of Surfaces From Volume Data", IEEE Computer Graphics and Applications, vol. 8, No. 3, May 1988, pp. 29–37.

* cited by examiner

*Primary Examiner*—Mark Zimmerman
(74) *Attorney, Agent, or Firm*—Oppenheimer Wolff & Donnelly, LLP; Leah Sherry

(57) ABSTRACT

Volumetric data are rendered onto an image plane by first organizing the volumetric data into a plurality of blocks of data, each block of data including a plurality of voxels arranged in cubic structure. The blocks of volumetric data are stored in, and processed by a processor element array of a massively data-parallel computer system. For any viewing angle, a plurality of parallel rays are cast through the image plane to traverse the volumetric data. In a ray collection phase, each processor element, in parallel with the other processor elements, determines which segments of the rays interpolate voxels of its associated block of data. In a segment value combination phase, each processor element, in parallel with the other processor elements, determines the integrated contribution of the interpolated voxels on the path of the ray segments traversing its block of data. And, in a final accumulation phase, the segment values for each ray are accumulated in order to determine the value of the pixels associated with each of the ray segments.

18 Claims, 8 Drawing Sheets

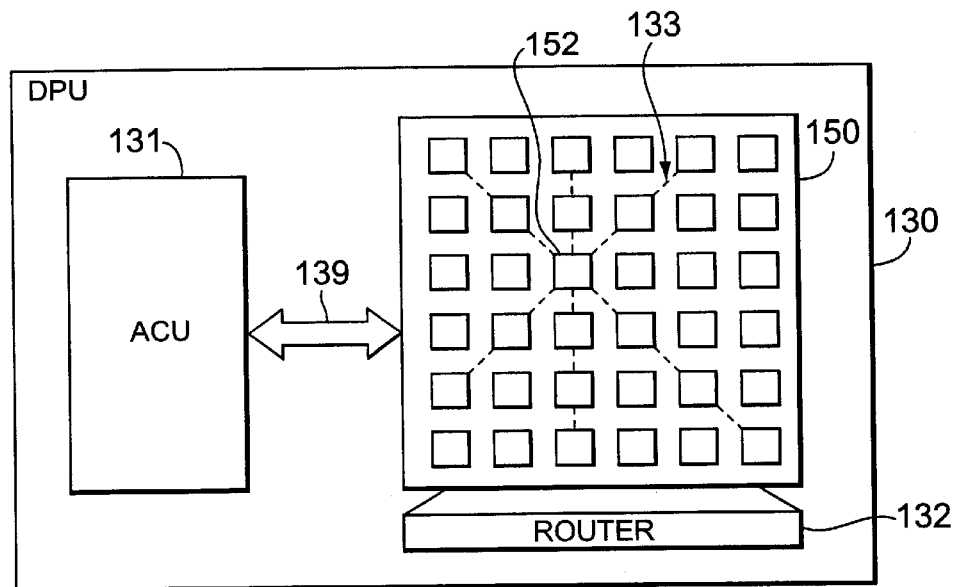
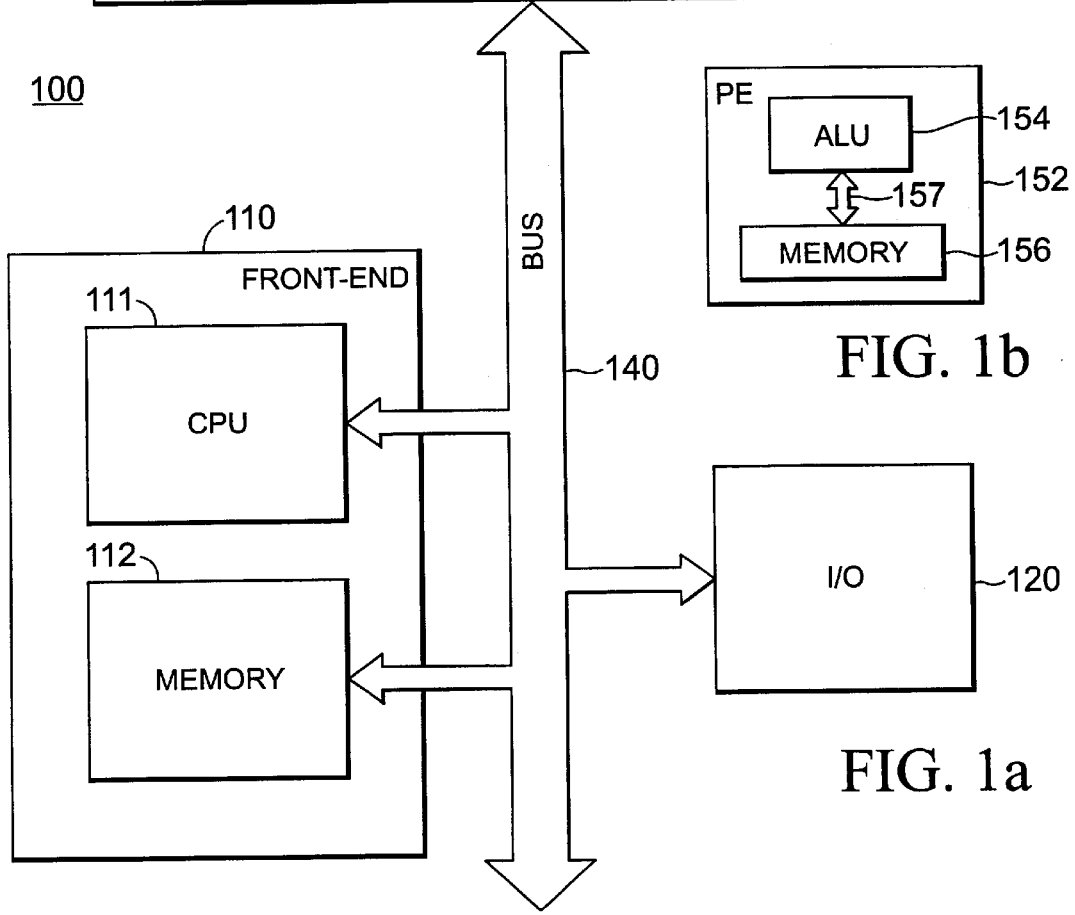
FIG. 1b
FIG. 1a

RAY LIST

| RAY | POSITION | | | VALUE | |
|---|---|---|---|---|---|
| | X | Y | Z | COLOR | OPACITY |
| RAY 1 | | | | | |
| RAY 2 | | | | | |
| RAY 3 | | | | | |
| ⋮ | | | | | |
| RAY 70 | | | | | |
| ⋮ | | | | | |
| RAY n | | | | | |

SEGMENTED RAY CASTING DATA PARALLEL VOLUME RENDERING

This application is a continuation of application Ser. No. 08/130,600 filed Oct. 1, 1993 now abandoned.

FIELD OF THE INVENTION

The present invention relates generally to computer systems, and more particularly, to rendering volumetric data to produce a two-dimensional image.

BACKGROUND OF THE INVENTION

Many physical objects can be represented spatially and temporally by computerized models. Scaler and vector volumetric data representing the structures or features of such objects can be generated empirically by using medical scanners, seismic survey, sonar, radar, and the like. Volumetric data can also be synthetically generated by computerized models. Objects represented can include the internal structure of atoms, the distribution of background radiation in the universe, or even imaginary objects.

Computer generated images produced with the volumetric data find utility in computer-aided design, and in scientific and medical visualization fields. A two-dimensional (2D) image perceived as a three-dimensional (3D) presentation can convey large amounts of information in a more comprehensible form than is possible using other traditional techniques such as statistical tables or voluminous prose. Translucent volume rendering or images representing a selected plane or slice through an object are especially helpful for studying internal structures, and for visually relating the interior of objects to their external forms.

Images presented in an animated sequence can take advantage of motion parallax for better morphological understanding of the object represented by the volumetric data. Currently, on most computer systems, the time required to generate 2D images from volumetric data is too long to support real-time generation rates and manipulation. If the images are generated too slowly, the viewer's attention lapses, thought processes are disrupted, and the significance of differences between successive frames of the image is lost.

In volume rendering, a volume element or "voxel" is the 3D equivalent of a 2D pixel, or picture element. Voxels are usually organized into a parallelpiped arrangement relative to some Cartesian coordinate system. Each voxel represents a quantum data unit of the volume. The voxel can have associated scaler or vector values symbolizing some property of the portion of the object in the immediate vicinity of the corresponding voxel.

To view an object represented by volumetric data, the values are mapped into pixels in the image plane. For the purpose of viewing, the data of the voxel data are usually expressed abstractly in terms of color and opacity. Color may be used to differentiate a particular object property, such as density or heat distribution, and the opacity of the color may indicate the relative intensity of the differentiation. For a given orientation of the object, the Cartesian grid of the volume data may not always align perfectly with the Cartesian grid of the image plane. Various techniques are known for deriving the value of the 3D space between adjacent voxels, for example, tri-linear interpolation.

The techniques of volume rendering can be categorized as either geometric iso-surface rendering, or direct volume rendering. Geometric iso-surface rendering converts the 3D data into geometry, usually polygons which can be displayed using traditional imaging techniques. However, other than for simple objects, substantial processing is usually required to extract the iso-surfaces.

Direct volume rendering, on the other hand, utilizes the entire original generated volumetric data in the final rendering of the image, and thus any part, including the interior of the object can be viewed by mapping the 3D voxels onto the 2D pixels. Two mapping techniques, forward and backward mapping, are commonly used for direct volume rendering.

In forward, or object space mapping, the 3D voxels are projected onto the 2D pixels of the image plane. Backward, or image space mapping places an imaginary viewer and an imaginary image plane in the three-dimensional environment of the object. The composition of the scene on the image plane is determined by casting imaginary rays through the pixels of image plane to traverse the volumetric data. The color and opacity of the volumetric data encountered approximately along the trajectory or path of the ray are interpolated, and integrated, usually at regularly spaced intervals to determine the colors and opacities of the pixels.

In general, ray-casting is well suited for manipulation by computer systems having massively parallel architectures. Massively parallel computers have a plurality of processor elements (PEs), each PE having access to an associated memory. Massively parallel computers are categorized as either Multi-Instruction Multiple-Data (MIMD), or Single-Instruction Multiple-Data (SIMD).

One of the main differences between MIMD and SIMD architectures is that the instruction stream is the same for each PE of a SIMD computer, whereas the instructions for the PEs of a MIMD computer can be different. In other words, MIMD computers can be considered extensions of uni-processors with each PE working on some portion of the total work-load. Typically, jobs are parceled out serially to the PEs as they become idle, with minimal attention paid to synchronizing the PEs.

On the other hand, in a SIMD computer, each PE is manipulating different data while constrained to execute the same instruction in a lock-step manner. Processes used by SIMD computers are sometimes called "data-parallel processes" since the parallelism is on the data, and not the executed instructions. As an advantage, SIMD computers can be provided with a substantially larger number of processor elements than comparably priced MIMD computers. For example, SIMD computers having thousands of PEs are readily available, while MIMD computers of a similar price typically include less than a hundred PEs.

Keeping many thousands of PEs busy, as will be discussed herein, is a non-trivial problem. Unless the work load is carefully balanced among the processors, the efficiencies gained by the high degree of parallelism are quickly lost. Since the SIMD architecture requires that all active processors, at any one time, execute the same instruction, inactive processors remain stalled until active processors have completed a current set of instructions. Therefore, while implementing applications for SIMD computers, the data structures and processes which manipulate the data must be especially designed in order to maximize processing parallelism.

In one known data-parallel implementations, the volumetric data are oriented so a particular processor element can find all of the data for determining color and opacity values of a particular ray within its associated memory. In more detail, the volumetric data are first distributed among the local memories of each PE according to each ray cast.

The goal is to have each PE cast a complete ray through the volumetric data stored in its associated memory, from start to finish. The required accumulation of pixel values, e.g., color and opacity, for a single ray are all performed within a single PE. Obviously, for a stationary viewing angle this technique is fairly efficient.

However, difficulties arise if the viewer desires to manipulate the represented object to view multiple orientations. To accomplish this in the prior art, the volumetric data are routed from PE to PE by a series of shears to align the data with a particular viewing angle. In addition to taking a considerable amount of time, multiple sheers tend to introduce progressively more observable artifacts into the final image as a result interpolation errors after shearing to reconstruct the Cartesian grid of the voxels.

Another data parallel volume rendering technique is based on object parallelism. That is, for a given set of data stored in a single processor, only the values of the intersecting rays are computed. Here, the volumetric data are only reoriented if the angle of rotation is greater than 45 degrees with respect to a Cartesian axes of the volumetric data. Once the volumetric data are in place, for any given viewing orientation that does not exceed 45 degrees from the original viewing orientation of the data, rays are cast into the volumetric data. Each PE stores adjacent columns or slices of data. If a particular ray stays within a slice, all data can be obtained from a single PE. Otherwise, if the orientation of the ray strays out of the bounds of the slice of data, the partial values of the ray are shifted to a neighboring PE for continued computation. In order to have all PEs shift their rays synchronously, the rays are not necessarily cast from their position on the image plane. Rather, the rays are spaced at the same offset as the voxels. By originating rays at an offset equal to the spacing between the voxels, parallel rays cross voxel boundaries at the same time, resulting in high processor utilization. However, to create the final image, the ray values must be reinterpolated to obtain the value of the pixel. Interpolation tends to introduce annoying artifacts in the image.

A closely related object parallel algorithm exists in the MIMD domain of massively parallel computers. Computers built according to the MIMD architecture are not constrained by the lock-step instruction cycles characteristic of SIMD processors. In a hybrid image partition-ray data flow technique of parallel ray casting, ray values are only computed when rays are cast through data within the spatial bounds of a particular processor. As an advantage, in MIMD architecture, rays do not need to be spaced at the same offset as the voxels. Therefore, reinterpolation of the ray values to produce the image is not required. However, as stated earlier, MIMD computers are relatively expensive when compared with SIMD computers having a substantially greater number of processors.

From the foregoing, it is apparent that there is a need for a technique which permits rapid volumetric data rendering. It is desired that the technique enables interactive visualization of represented objects without diminishing the quality of the rendered image. It is to these ends the present invention is directed.

SUMMARY OF THE INVENTION

A system and method are provided for interactively visualizing a real or imaginary object represented by three-dimensional or volumetric data. The volumetric data, which may be empirically or synthetically generated, are composed of values or voxels. The voxels are projected onto a two-dimensional image plane having a plurality of pixels. The visualization, in part, is achieved by organizing the volumetric data into a plurality of blocks of data, each block of data including a plurality of voxels arranged in parallelpiped structure. Each block of volumetric data is stored in, and processed by a particular processor element of a massively data-parallel computer system having a plurality of processor elements.

After the blocks of volumetric data are fixed in the associated processor elements, the volumetric data may be rendered for any viewing angle, without any further rearrangement of the volumetric data. Preferably, a plurality of rays are cast through the image plane to traverse the volumetric data. The rays are preferably normal to the image plane for a given viewing angle. There is one ray for each pixel of the image plane. That portion of a particular ray which traverses a particular block of data is called a ray segment. The volumetric data approximately along the path of the ray segments are interpolated, and integrated at regularly spaced intervals.

The object can be rendered, at a higher degree of parallelism, by performing phased processes on the volumetric data. Rendering can be performed for any viewing angle without requiring the data to be routed to different processor elements. In addition, the image can be produced without reinterpolating the volumetric data thus avoiding undesirable artifacts.

In a ray collection phase, each processor element, in parallel with the other processor elements, determines which sub-set of ray segments traverse the associated block of data. The sub-sets of ray segments are determined by projecting the faces of the associated block of data onto the image plane.

In a segment combining phase, each processor element, in parallel with the other processor elements, determines the integrated contribution of the interpolated values for the sub-set of ray segments traversing its block of data.

In a final accumulation phase, the segment values of each entire ray are accumulated in order to determine the value of the associated pixels.

BRIEF DESCRIPTION OF THE DRAWINGS

FIG. 1a is a block diagram of a data parallel computer which can be used for volume rendering;

FIG. 1b is a block diagram of a processor element of the computer of FIG. 1a;

FIG. 5 is a table showing an example of a data structure for a list of rays which traverse through a block of data;

DETAILED DESCRIPTION OF A PREFERRED EMBODIMENT

Figure 2:
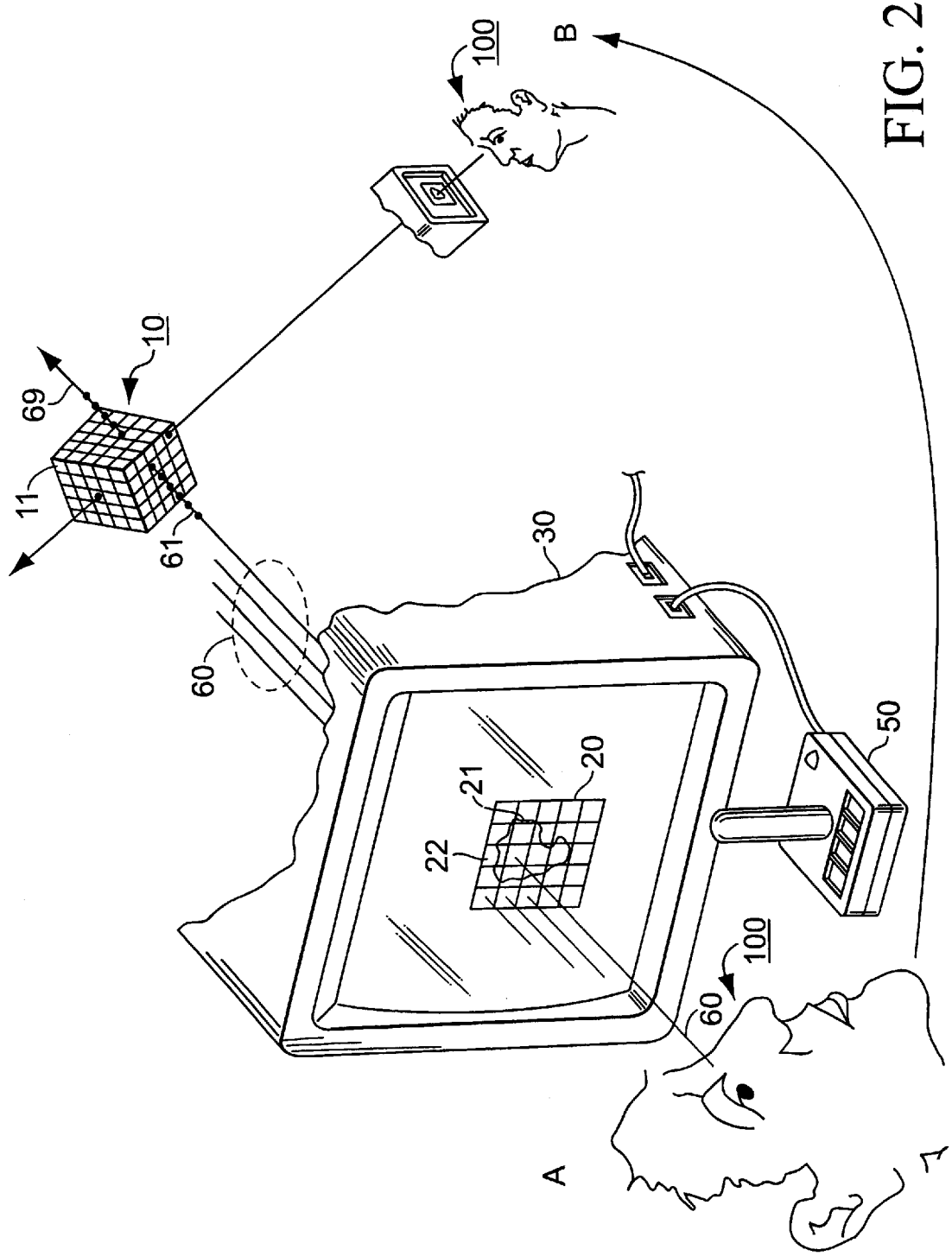
FIG. 2 diagrammatically shows the rendering of volumetric data onto a two-dimensional image plane at two different angles relative to an object represented by the volumetric data.

FIG. 1a shows a Single-Instruction Multi-Data (SIMD) massively parallel computer system 100 which may be used according to the principles of the invention to render two-dimensional (2D) images from three-dimensional (3D) or volumetric data representative of a real or imaginary object. The computer system 100 can include a front-end (FE) sub-system 110, an input/output (I/O) sub-system 120, and a data parallel unit (DPU) 130, all connected to each other by a data communications bus 140.

The front-end sub-system 110 includes a central processor unit (CPU) 111 and local memory 112. The CPU 111 is under the control of an operating system, for example, "UNIX." The FE sub-system 110 is responsible for coordinating the overall operation of the parallel computer system. 100.

The I/O sub-system 120 typically includes input devices such as a key-board, a mouse or a joy-stick etc., output devices such a display unit, printers, and the like, and bulk storage devices such as tape and disk. The I/O sub-system 120 can also include communication interfaces to networks such as "ETHERNET."

The data parallel unit 130 includes an array control unit (ACU) 131, a processor element (PE) array 150, and a global router 132. The ACU 131 and PE array 150 are connected to each other by an ACU-PE bus 139. The ACU 131 can be a register-based load/store processor with internal registers, data and instruction memory. The ACU 131 directly controls the operation of the PE array 150.

The PE array 150 includes a plurality of processor elements (PEs) 152. The PE array 150 can range in size from 1K (32×32) to 16K (128×128) PEs 152. Diverging briefly to FIG. 1b, each PE 152 has an arithmetic logic unit 154, and, a local data memory 156 of, for example, 16K or 64K bytes of memory, connected to each other by bus 157.

The PEs 152 can communicate with each other via a nearest neighbor network 133 and the global router 132. For the purpose of nearest neighbor network 133, the PEs 152 may be arranged as a 2D toroidal mesh to permit rapid data communication between the adjacent eight neighboring PEs 152 located in vertical, horizontal, and diagonal directions, as generally indicated by reference numeral 133. The nearest neighbor network 133 is the fastest means for parallel data communications, but it is restricted by having all processor elements shift data by the same amount for a given single instruction.

With the global router 132, the speed of communication is sacrificed for flexibility in routing. In other words, data can be arbitrarily routed between any of the PEs 152 for a given single instruction, but at a slower speed.

FIG. 2 diagrammatically shows how the computer system 100 can be used to render a 2D image 21 from volumetric data 10. The volumetric data 10 represents a real or imaginary object. The volumetric data 10 may be empirically generated, for example from a CAT scanner, or the data can be synthetically generated by, for example, the front-end subsystem 110 using well-known modeling techniques. The data can be scaler or vector values. The generated data are associated with a plurality of voxels 11 arranged in a parallelpiped structure, each voxel 11 representing some quantum data unit volume of the represented object.

It is desired to render the volumetric data 10 as an image 21 that is perceived as being a 3D image. The image 21 may be projected onto a two-dimensional (2D) image plane 20 of a display device 30 of the I/O sub-system 120. The image plane 20 includes a plurality of picture elements or pixels 22 usually arranged according to some Cartesian coordinate system. Interactive manipulation of the volumetric data 10 may be accomplished with a control device, for example a joy-stick 50. Thus, the properties of the represented object can be studied in 3D space, from different viewing angles, such as position A and position B as shown in FIG. 2.

As mentioned above, with most prior art SIMD rendering systems, the amount of time required to process volumetric data is too large to permit real-time volume rendering in response to interactive viewer manipulation. In most known rendering systems, the rendering time is proportional, in part, to the time required to rearrange the volumetric data while the object is rotated to display a view from a different angle.

Moreover, unless the workload is uniformly distributed over the processor elements 152, and unless the steps of the rendering process are carefully phased, some of the processors elements may be inactive for a substantial amount of time. Inactive processor elements will decrease throughput performance.

In addition, reorientation of the volumetric data 10 tends to shift the voxels positions so that they are no longer aligned with the pixels 22 of the image plane 20. Therefore, voxel values may need to be reinterpolated. Reinterpolation can introduce undesirable artifacts into the image 21.

The invention affords a segmented ray casting system for data parallel volume rendering that enables the generation of two-dimensional images of the object in a fraction of a second, without artifacts. The method and apparatus of the invention can generate images at a rate suitable for animated scene development without unduly restricting the orientation of the object.

More specifically, as is shown in FIG. 2, the segment ray casting system and method enables scenes to be rendered by adjusting the viewing angle without aligning the volumetric data 10. The volumetric data 10 are held stationary in the PE array 150, while the image plane 20 is oriented about the volumetric data 10. The preferred structure of the stationary volumetric data 10 in the PE array is described in further detail below.

By using an input device such as the joy-stick 50, the image plane 20 may be adjusted to be normal to the desired viewing angle, e.g. position A or position B, as shown in FIG. 2. A plurality of imaginary rays 60, at right angles to the plane of the image 20, are cast through volumetric data 10. That is, there is one orthogonal ray 60 cast for each pixel 22 of the image plane 20. The volumetric data 10 along the trajectory of the rays 60, i.e., the voxels 11 approximately along the path of the imaginary ray 60, are interpolated at regular intervals, for example intervals 61 to 69, and extracted as color and opacity values. The color and opacity values are integrated to generate the color and opacity for each of the pixels 22 to render a particular orientation of the volumetric data 10. The process of interpolating, and integrating voxel values will hereinafter be referred to as "combining the voxel values."

Figure 3:
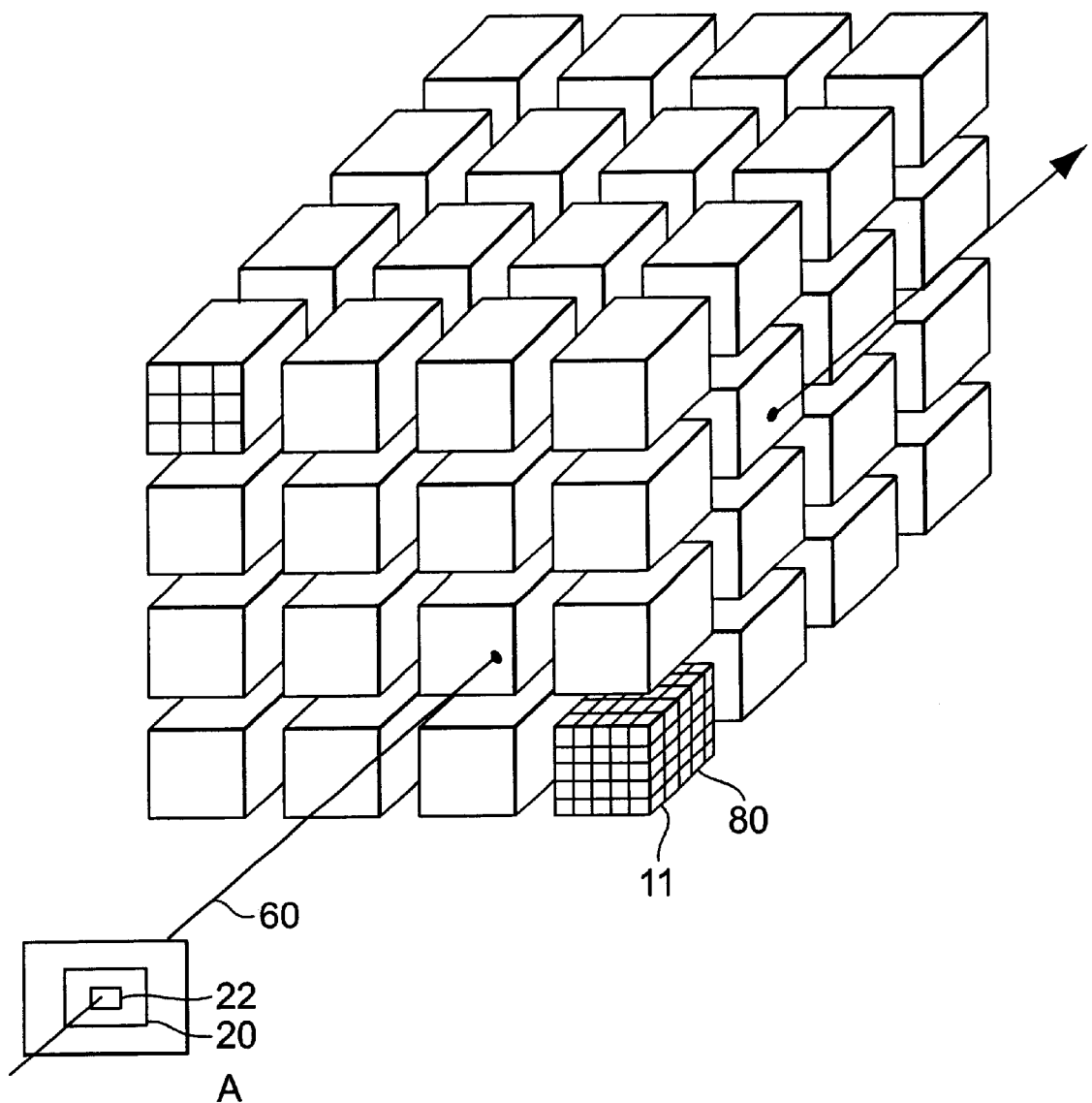
FIG. 3 is a perspective diagrammatic view of the three-dimensional volumetric data partitioned into a plurality of parallelpiped blocks of data.

FIG. 3 illustrates a preferred organization of the volumetric data 10 in accordance with the principles of the invention. To maximize utilization of the PE array 150, and to minimize rendering time disparities between various and rapidly shifting viewing angles, the volumetric data 10 are organized into a subset of parallelpiped voxels or blocks of data 80. Each block of data 80 may be stored in an associated memory of one of the processor elements 152 of the PE array 150. Unlike most known SIMD implementation, once the volumetric data 10 are stored in the PE array 150, they do not need to be moved again for different views.

The ratio of the lengths along each dimension of the blocks of data 80 are preferably configured as close to 1:1:1 as possible. The preferred shape of the blocks of data 80 is cubic to increase the likelihood that each block of data 80 or subset of voxels 11, when processed in parallel by a corresponding PE 152, will consume about the same amount of processing time. This maximizes utilization of the PE array 150 regardless of orientation of the viewing angle. All of the blocks of data 80 processed by each phase of the rendering process, detailed below, are processed synchronously, in a lock-step manner, step-to-step latencies are minimized.

After the blocks of data 80 are distributed in the PE array 150 by, for example, the array control unit 131, the blocks of data 80 may be processed in a sequence of steps which are phased to maximize the data parallel architecture of the SIMD computer 100. That is, the processing steps of each of the PEs 152 manipulate the blocks of data 80 of the partitioned volumetric data 10, and the pixels 22 of the image plane 20 in parallel during each phase of the rendering process. In the preferred embodiment of the invention, the phases of the process, which are described in greater detail below, are: ray collection, segment value combination, and final accumulation.

Phase I—Ray Collection

During the ray collection phase, for a given viewing angle, e.g. either position A or B in FIG. 2, each PE 152, in parallel with the other PEs 152, determines which of the rays 60 normal to the image plane 20 traverse through the block of data 80 stored in its associated memory 156.

Figure 4:
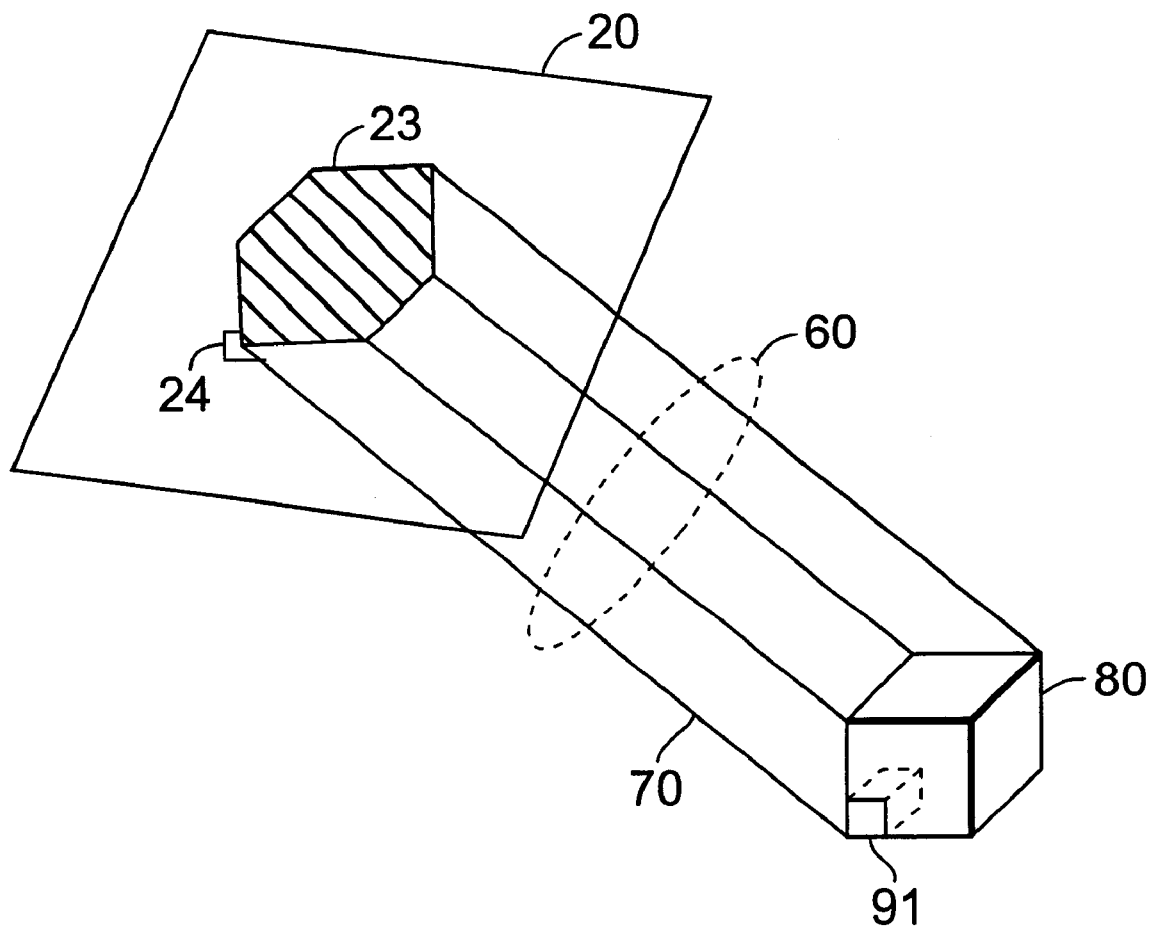
FIG. 4 shows the projection of a three-dimensional block of data onto a two-dimensional image plane.

FIG. 4 shows a first step of the ray collection phase. The block of data 80 is projected onto the image plane 20 along the trajectory or path of the rays, generally indicated by numeral 60. The projected block of data silhouettes a subset of the pixels 22 which are within, for example, a polygon 23. Only the silhouetted pixels can be the origin of rays traversing through the block of data 80. For example, a ray 70 emanating from a pixel 24 traverses voxel 91 of the block of data 80. However, for reasons that will be described, this projection is only a first approximation of the rays which actually interpolate and integrate volumetric data within the projected block of data.

As shown in FIG. 5, each PE 152 a maintains a data structure of a ray list 200 which includes an entry 210 for each ray traversing through the block of data 80 stored in its data memory 156. Each entry 210 includes a ray identification (ID) 211 to uniquely identify the traversing ray. The ray ID 211 is of course directly related to the pixel from which the ray emerges. The ray position 212 may be given in, for example, Cartesian coordinates x, y, and z, and may indicate the point where the ray enters the block of data 80. Values 213 associated with the entries 210, expressed as, for example, color and opacity, are preferably initially set to zero.

Figure 6:
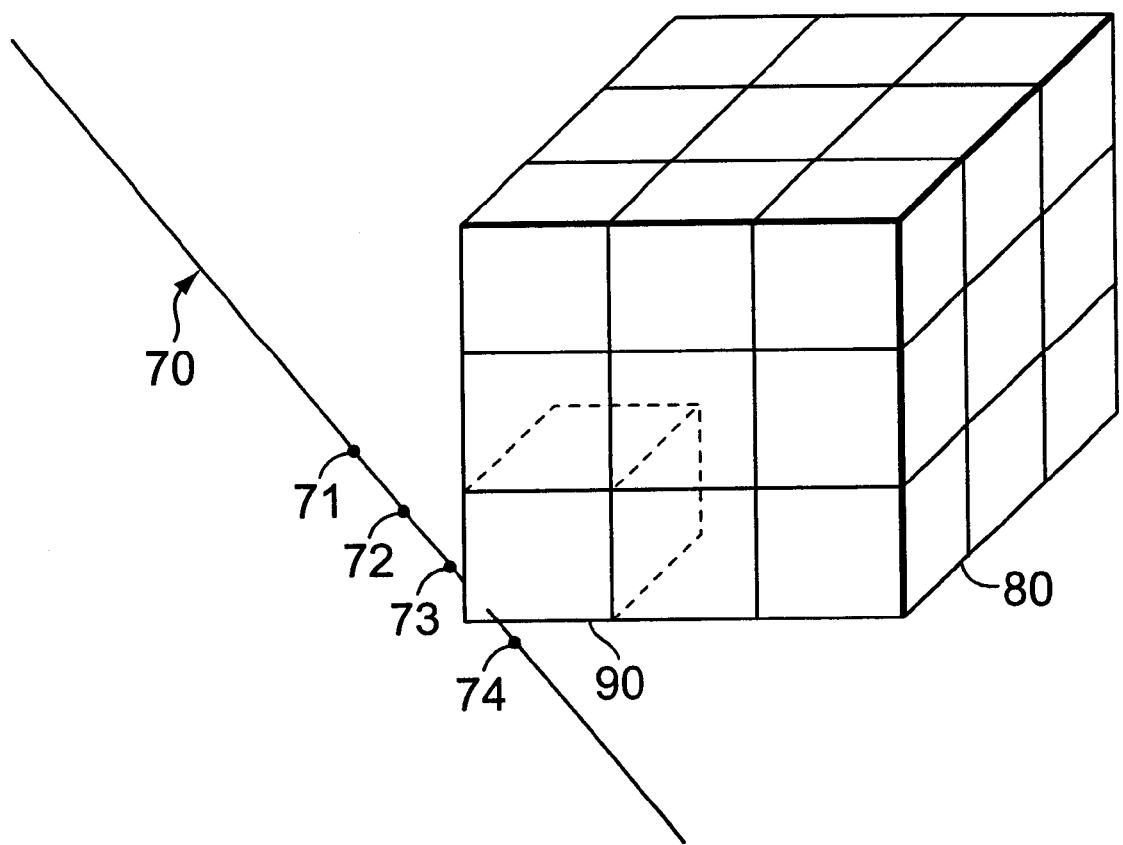
FIG. 6 shows a ray traversing a block of data.

As is shown in FIG. 6, not all rays of a particular ray list 200 necessarily interpolate and integrate voxel values of the block of data 80. If the volumetric data 10 is examined at, for example, regularly spaced intervals 71–74, then ray 70 does not interpolate any voxel values during its traversal of the block of data 80. Therefore, in a second step of the ray collection phase, the ray list 200 may be refined to remove such rays.

After the ray lists 200 have been constructed for each of the blocks of data 80, the next phase, segment value combination, can commence.

Phase II—Segment Value Combination

In the segment value combination phase, each PE 152 computes the relative contribution, or "segment value," of voxels positioned approximately along the path of the segment of the ray delineated by the boundaries of the block of data 80. The combined values of each of the ray segments of the ray list 200 of a particular processor element may be accumulated in the value column 213 of the ray list 200. The exact integration function used during this phase is usually determined by the type of image that is desired. The only requirement is that the integration function observe the associative property. The associative property is observed if the order in which ray values are combined is not changed for different groupings of values.

Figure 7:
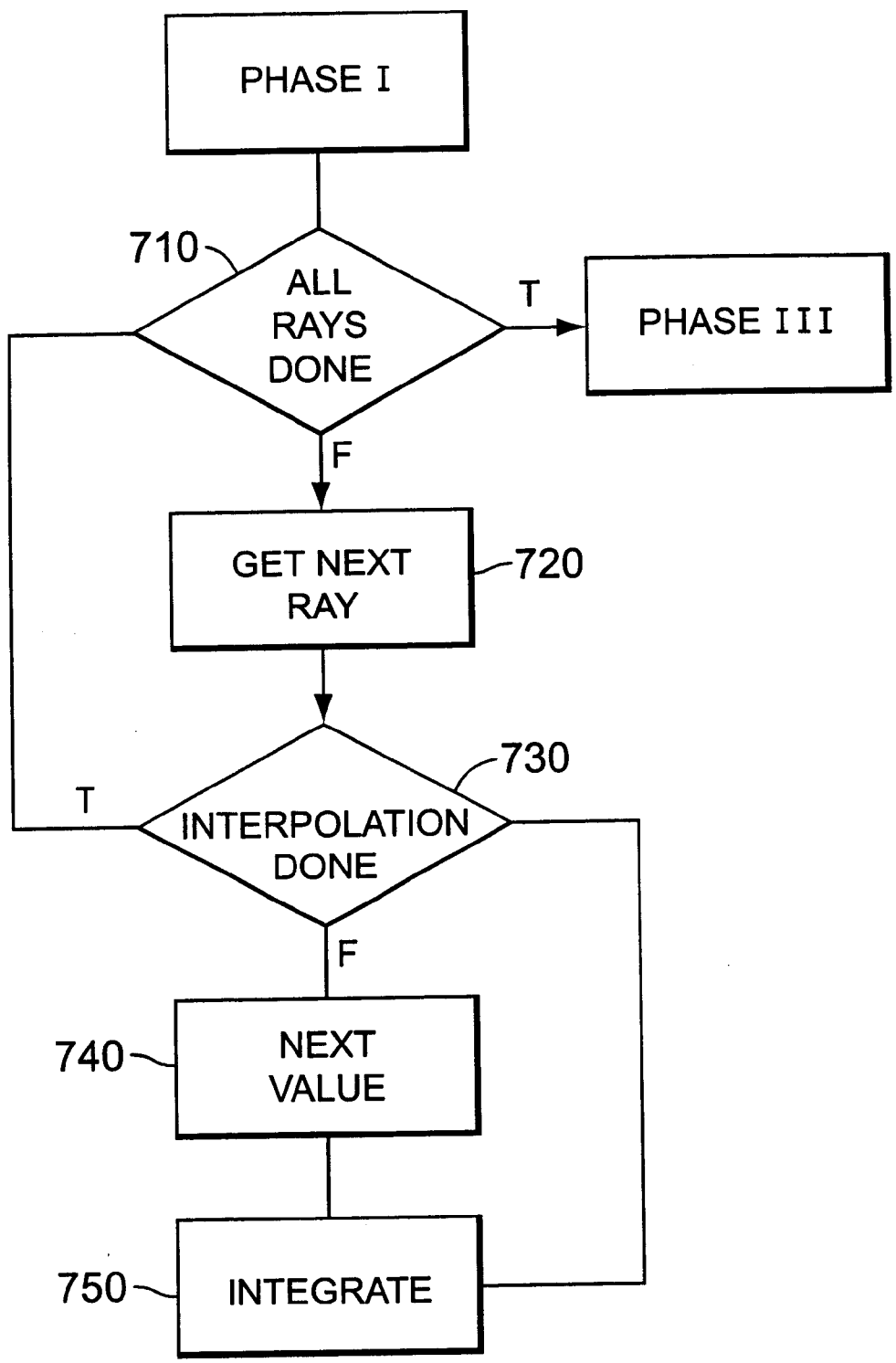
FIG. 7 is a flow diagram illustrating a process of the invention.

The preferred process of the voxel value combining phase of the invention is shown in FIG. 7. The process which combines the voxel values can be stated as follows.

1) For each block of data 80 processed in parallel by a corresponding PE 152;
2) In steps 710 and 720, for each ray traversing the block of data;
3) In steps 730 and 740, interpolate the voxel value; and
4) In step 750 integrate the current interpolated value with previously acquired values to determine the contribution of the ray segment to the color and value of the associated pixel.

The integration functions used may vary. For example, the integration function for a transmission display such as a radiographic image determines a weighted sum of the encountered voxel values. The integration function for iso-surfaces usually compute the normalized lighting contribution of the voxels. Maximal Intensity Projection (MIP) simply takes the largest value encountered as its final color. A common integration function can be expressed as:

$$c_{i+1} = c_i + c_s a_s (1-a_i)$$

$$a_{i+1} = a_i + a_s (1-a_i)$$

where:

$c_i$ is the current integrated color value of a pixel;

$c_s$ is the color value of the currently interpolated voxel;

$c_{i+1}$ is the accumulated color value of the pixel including the currently interpolated voxel;

$a_i$ is the current integrated opacity value of the pixel;

$a_s$ is the opacity value of the currently interpolated voxel; and $a_{i+1}$ is the accumulated opacity value of the pixel including the currently interpolated voxel.

During the segment value combination phase, each PE 152 determines the color and opacity contribution of all of the ray segments traversing a particular block of data. Each ray segment is associated with a particular pixel.

Figure 8:
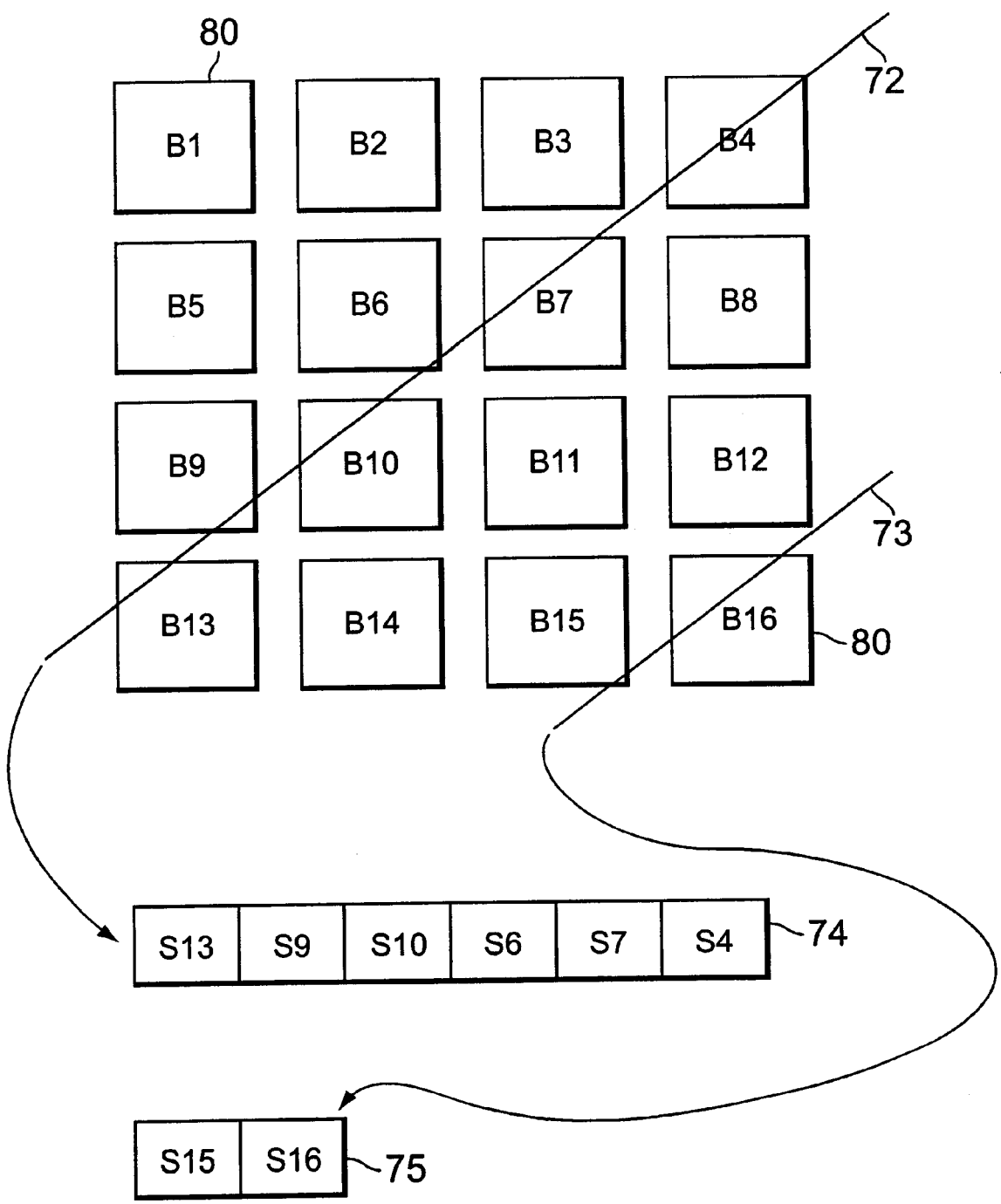
FIG. 8 shows an ordered ray segment lists produced by the method of FIG. 7.

As each processor element 152 completes the computation of a combined segment value for a particular ray segment, the combined value 213 for a particular ray segment maybe communicated to a processor element 152 responsible for determining the color and opacity values of an entire ray. An entire ray is associated with each one of the pixels 22. That is, associated with each pixel 22 there is a corresponding PE 152. The ray segment values can be maintained in, for example, a list which reflects the sequence of traversal of the individual ray segments. The list is further described with respect to FIG. 8. After all segments for all blocks of data have had their values combined, the final accumulation phase can commence.

Phase III—Final Accumulation

In the final accumulation phase, for each of the pixels 22 of the image plane 20, all of the combined segment values of the entire ray cast through the pixel are integrated. The segment values are integrated in the same order as their proximity to the image plane. Shown in FIG. 8, by way of example, are some of the blocks of data 80, enumerated B1 to B16. A first ray 72 sequentially traverses blocks of data B13, B9, B10, B6, B7, and B4. A second ray 73 sequentially traverses blocks of data B15 and B16. The lists 74 and 75 store the ray segment values S13, S9, S10, S6, S7, and S4, and S15, S16, obtained during the integration in phase II, in corresponding order for rays 72 and 73, respectively.

Thus, should the PE 152 which is responsible for determining the ray segment value S10 for the block of data B10 complete its task at a later point in time than the PEs associated with blocks of data B9 and B6, the segment value S10 is inserted between the segment values S9 and S6 obtained from the blocks of data B9 and B6. In other words, if a particular block of data is occluded from the image plane 20 by intervening blocks of data, the segment value corresponding to the ray segment traversing the occluded block of data is inserted in the list after any values of any ray segments traversing intervening blocks of data.

Proper integration of the ray segment values require that the integration function be associative. The common integration function $$c_{i+1}=c_i+c_s a_s(1-a_i)$$
$$a_{i+1}=a_i+a_s(1-a_i)$$

can be represented as a function of two vectors, r and s, the first describes the current ray values, and the second describes the interpolated values. That is, we let:

$r=[c_i \ a_i]^T$, and $s=[c_s a_s \ a_s]^T$.

Then for the function:

$$F(s,r)=r_0+s_0(1-r_1)$$

$r_1 + s_1(1-r_1)$

It can be algebraically proven that:

F (s', F (s, r)) and F (F (s',s), r)

are equivalent, where s and s' are adjacent interpolated values. In other words, associativity is true for the integration function, and individual ray segment values can be integrated as disclosed herein.

A significant difference between segmented ray casting in accordance with the invention, and other known rendering procedures employing SIMD systems, is image quality. Holding the volumetric data steady while changing the viewing angle, as is done in the invention, eliminates undesirable artifacts due to reinterpolation. This makes the segmented ray casting of the invention particularly useful for medical applications where accurate, artifact free, image reproduction is of paramount importance for reliable diagnosis.

In addition, the segmented ray collection, integration, and accumulation according to the invention, improves the distribution of the workload over the processor elements of a massively parallel computer in a scaleable fashion. Therefore, the methods according to the invention decrease the amount of time required for rendering. Also, since the data are held stationary, volumetric data routing time is eliminated. Thus the method and system according to the invention make interactive viewing a possibility.

Also, the processing time required for different integration functions or interpretations of a particular viewing angle can be reduced by using the phased methodology according to the invention. The collection of rays for a particular viewing angle is determined in Phase I. Different renderings can be produced by only repeating Phases II and III with different integration functions.

The foregoing is merely illustrative of the principles of the invention. Those skilled in the arts will be able to create arrangements which, although not explicitly described herein, nevertheless, embody the principles within the spirit and scope of the invention as expressed in the appended claims.

What is claimed is:

1. An apparatus for rendering a three-dimensional object onto a two-dimensional image plane of a viewing device, the three-dimensional object expressed as volumetric data, the volumetric data including a plurality of voxels, each one of the plurality of voxels having an intensity value representative of a portion of the three-dimensional object, the image plane having a plurality of pixels, comprising:

an array of processor elements, each one of the processor elements of the array including a memory, each memory storing a subset of the plurality of voxels at fixed locations of the memory and a ray list, each of the subsets of voxels being a parallelepiped block of a portion of the plurality of voxels;

means for selecting a viewing angle of the image plane with respect to the subsets of voxels stored at the fixed locations of the memories;

means for projecting a plurality of rays from the image plane through the subsets of voxels stored at the fixed locations of the memories, the plurality of rays being projected orthogonal to the image plane with each of the plurality of projected rays having a corresponding entry in the ray list, there being one of the plurality of rays projected from each one of the plurality of pixels of the image plane, a portion of each one of the plurality of rays which is projected through one of the subsets of voxels being a ray segment;

means for combining, for each ray segment, the intensity values of the voxels positioned approximately along each ray segment into a segment intensity value; and means for accumulating, for each of the plurality of rays, the segment intensity values of the ray segments into a pixel intensity value, the pixel intensity value associated with each of the plurality of rays being utilized to render the tree-dimensional object onto the image plane of the viewing device while the plurality of voxels remain stored at the fixed locations of the memories of the array of processors for any selected viewing angle.

2. The apparatus of claim 1, wherein the means for combining combines the intensity values of the voxels using an associative function.

3. The apparatus of claim 2, wherein the associative function is expressed as $$c_{i+1}=c_i+c_s a_s(1-a_i) \text{ and } a_{i+1}=a_i+a_s(1+a_i),$$

where $c_i$ is a current accumulated color value of a pixel, $c_s$ is a color value of a currently interpolated voxel, $c_{i+1}$ is a next accumulated color value of the pixel including the color value of the currently interpolated voxel, $a_s$ is an opacity value of the currently interpolated voxel, $a_i$ is a current accumulated opacity value of the pixel, and $a_{i+1}$ is a next accumulated opacity value of the pixel including the opacity value of the currently interpolated voxel.

4. The apparatus of claim 1, wherein each entry of the ray list includes a ray identification, positional coordinates of the projected ray, and intensity values, the intensity values including color and opacity values associated with the three-dimensional object.

5. The apparatus of claim 1, wherein the intensity values of each ray segment are interpolated from the intensity values of the voxels positioned approximately along the path of each ray segment.

6. The apparatus of claim 1, wherein each parallelpiped block of a portion of the plurality of voxels is cubic.

7. The apparatus of claim 1, wherein for each of the plurality of rays the ray segment intensity values of the ray segments are stored in an order in the array list that corresponds to an order in which the subsets of volumetric data were traversed by the corresponding ray of the plurality of rays.

8. The apparatus of claim 1, wherein the array of processor elements is configured to form a single-instruction multiple-data multi-processor system.

9. An apparatus for rendering volumetric data having intensity values onto a viewing device, comprising:
    an array of processors, each processor including a memory, each memory storing a subset of the volumetric data at fixed locations of the memory and an array list;
    a ray projecting means for projecting a plurality of rays orthogonal to a selected image plane of the viewing device through the subsets of volumetric data with each of the plurality of projected rays having a corresponding entry in the ray list, and retrieving ray segment values corresponding to a portion of each ray projected through one of the subsets of volumetric data; and
    means for combining the ray segment values of each ray into a pixel value, the pixel value associated with each ray being utilized to render the volumetric data onto the selected image plane of the viewing device.

10. A computerized method for rendering volumetric data having intensity values onto a viewing device using an array of processors, each processor including a memory, comprising:
    storing a subset of the volumetric data at fixed locations of each memory;
    storing an array list with a plurality of entries in each memory, there being an entry in the array list for each of a plurality of rays;
    orthogonally projecting the plurality of rays from a selected image plane of the viewing device through the subsets of volumetric data;
    retrieving ray segment intensity values corresponding to a portion of each ray projected through one of the subsets of volumetric data; and
    combining the array segment intensity values of each ray into a pixel value, the pixel value being associated with each ray being utilized to render the volumetric data onto the selected image plane of the viewing device.

11. A method for rendering a three-dimensional object represented by volumetric data onto a two-dimensional image plane that includes a plurality of pixels, the method comprising the steps of:
    organizing the volumetric data into a plurality of blocks;
    associating each of the plurality of blocks with a corresponding one of a plurality of processors;
    casting a ray from one of the plurality of pixels of the image plane;
    identifying a first segment of the cast ray, wherein the first segment traverses a first of the plurality of blocks associated with a first of the plurality of processors;
    identifying a second segment of the cast ray, wherein the second segment traverses a second of the plurality of blocks associated with a second of the plurality of processors;
    determining a first intensity value for the first segment and a second intensity value for the second segment;
    storing the first and second intensity values in a list, wherein the first and second intensity values have each a respective position in the list; and
    determining a pixel intensity value for the pixel associated with the cast ray by accumulating the first and the second intensity values.

12. The method of claim 11, wherein;
    the step of determining the first intensity value includes combining the intensity values of a first plurality of voxels positioned along the first segment and the step of determining the second intensity value includes combining the intensity values of a second plurality of voxels positioned along the second segment.

13. The method of claim 11, wherein the plurality of processors is configured to form a single instructions multiple-data multi-processor system.

14. The method of claim 11, wherein the position of the first intensity value relative to the position of the second intensity value is determined by the order in which the first of the plurality of blocks and the second of the plurality of blocks were traversed by the cast ray.

15. A computing system for rendering a three-dimensional object represented as volumetric data onto a two-dimensional image plane that includes a plurality of pixels, the computer system comprising:
    a computer readable storage medium embodying a computer program; and
    a plurality of processors configured to read the computer program and operate so as to
        organize the volumetric data into a plurality of blocks,
        associate each of the plurality of blocks with a corresponding one of a plurality of processors,
        cast a ray from one of the plurality of pixels of the image plane,
        identify a first segment of the cast ray, wherein the first segment traverses a first of the plurality of blocks associated with a first of the plurality of processors,
        identify a second segment of the cast ray, wherein the second segment traverses a second of the plurality of blocks associated with a second of the plurality of processors,
        determine a first intensity value for the first segment and a second intensity value for the second segment,
        store the first and second intensity values in a list, wherein the first and second intensity values have each a respective position in the list, and
        determine a pixel intensity value for the pixel associated with the cast ray by accumulating the first and second intensity values.

16. The computer system of claim 15, wherein the plurality of processors are configured to form a single-instruction multiple-data multi-processor system.

17. The computer system of claim 15, wherein the position of the first intensity value relative to the position of the second intensity value is determined by the order in which the blocks were traversed by the cast ray.

18. The computer system of claim 15, wherein the plurality of processors are further configured to read the computer program and operate so as to
    combine the intensity values of a first plurality of voxels positioned along the first segment.

* * * * *